(12) United States Patent
Lang et al.

(10) Patent No.: US 11,795,556 B2
(45) Date of Patent: Oct. 24, 2023

(54) FE-DOPED MOS$_2$ NANO-MATERIAL, PREPARATION METHOD THEREFOR AND USE THEREOF

(71) Applicant: SOOCHOW UNIVERSITY, Suzhou (CN)

(72) Inventors: Jianping Lang, Suzhou (CN); Jiangyan Xue, Suzhou (CN); Chunyan Ni, Suzhou (CN); Hong Yu, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 735 days.

(21) Appl. No.: 16/970,355

(22) PCT Filed: Nov. 13, 2018

(86) PCT No.: PCT/CN2018/115194
§ 371 (c)(1),
(2) Date: Aug. 15, 2020

(87) PCT Pub. No.: WO2020/082443
PCT Pub. Date: Apr. 30, 2020

(65) Prior Publication Data
US 2021/0062350 A1    Mar. 4, 2021

(30) Foreign Application Priority Data

Oct. 26, 2018   (CN) .......................... 201811258080.5

(51) Int. Cl.
C25B 11/091    (2021.01)
C25B 1/02      (2006.01)
B01J 27/051    (2006.01)

(52) U.S. Cl.
CPC ........... *C25B 11/091* (2021.01); *B01J 27/051* (2013.01); *B01J 27/0515* (2013.01); *C25B 1/02* (2013.01)

(58) Field of Classification Search
CPC ... B01J 27/051; B01J 27/0515; C25B 11/091; C25B 1/02
(Continued)

(56) References Cited

U.S. PATENT DOCUMENTS 3,000,816 A * 9/1961 Vernon ................. C10G 45/08
                                                  502/220
4,632,747 A * 12/1986 Ho ....................... C10G 49/04
                                                  208/112
(Continued)

FOREIGN PATENT DOCUMENTS

CN   106608652 A     5/2017
CN   106608847 A *   5/2017  ........... C07C 249/02
(Continued)

OTHER PUBLICATIONS

English Translation of the Written Opinion for PCT/CN2018/115194. (Year: 2019).*
(Continued)

*Primary Examiner* — Patricia L. Hailey
(74) *Attorney, Agent, or Firm* — SZDC LAW P.C.

(57) ABSTRACT

The invention discloses a method for preparing a Fe-doped MoS$_2$ nano-material, which comprises the following steps: dissolving a ferric salt and ammonium tetrathiomolybdate in DMF and reacting at 180-200° C. for 6-24 hrs to obtain a Fe-doped MoS$_2$ nano-material. The present invention also provides a Fe-doped MoS$_2$ nano-material supported by nickel foam, which includes a nickel foam substrate and the Fe-doped MoS$_2$ nano-material loaded on the nickel foam substrate. Furthermore, the present invention also provides a
(Continued)

preparation method and use of the above materials. In the invention, the desired product can be obtained by a one-pot solvothermal reaction, and thus the operation is simple. There is no need to introduce a surfactant for morphological control during the preparation process, and the resulting product has a clean surface and is easy to wash.

10 Claims, 8 Drawing Sheets

(58) Field of Classification Search
USPC .................................................. 502/220, 221
See application file for complete search history.

(56) References Cited

U.S. PATENT DOCUMENTS

| 11,396,521 B2* | 7/2022 | Lang | .................. C25B 1/04 |
| 2019/0030516 A1* | 1/2019 | Zhang | ................... B01J 35/023 |

FOREIGN PATENT DOCUMENTS

| CN | 107102039 A | | 8/2017 | |
| CN | 108023080 A | * | 5/2018 | .......... H01M 10/054 |
| CN | 108118362 A | | 6/2018 | |
| CN | 108910953 A | * | 11/2018 | .............. C01G 39/06 |
| CN | 109467958 A | * | 3/2019 | ............... C09D 1/00 |
| CN | 111377480 A | * | 7/2020 | .............. B01J 19/10 |
| CN | 111847513 A | * | 10/2020 | ............ B01J 27/051 |
| KR | 20210127527 A | * | 10/2021 | ............ B01J 27/051 |

OTHER PUBLICATIONS

Xue Zhao et al., "FeS2-doped MoS2 nanoflower with the dominant 1T-MoS2 phase as an excellent electrocatalyst for high-performance hydrogen evolution." Electrochimica Acta 249, pp. 72-78. (Year: 2017).*

Priya Singh et al., "Fe-doped MoS2 nanomaterials with amplified peroxidase mimetic activity for the colorimetric detection of glutathione in human serum." Materials Chemistry and Physics 267, pp. 1-9. (Year: 2021).*

P. Sundara Venkatesh et al., "Transition metal doped MoS2 nanosheets for electrocatalytic hydrogen evolution reaction." International Journal of Hydrogen Energy 47, pp. 37256-37263. (Year: 2022).*

Zhongxu Li et al., "High-performance iron-doped molybdenum disulfide photocatalysts enhance peroxomonosulfate activation for water decontamination." Chemical Engineering Journal 446, pp. 1-13. (Year: 2022).*

Yanna Guo et al., "Nanoarchitectonics for Transition-Metal-Sulfide-Based Electrocatalysts for Water Splitting." Advanced Materials, 31, pp. 1-34. (Year: 2019).*

Jiabao Ding et al., "Transition Metal-Doped Edge-Terminated MoS2 Superstructures as Efficient Catalysts for H2 Production." Advanced Materials Interfaces, pp. 1-6. (Year: 2018).*

Man Liu et al., "Use of Metal Sulfides as Anode Catalysts in H2S-Air SOFCs." Journal of the Electrochemical Society 150, pp. A1025-A1029. (Year: 2003).*

* cited by examiner

FE-DOPED MOS$_2$ NANO-MATERIAL, PREPARATION METHOD THEREFOR AND USE THEREOF

This application is the National Stage Application of PCT/CN2018/115194, filed on Nov. 13, 2018, which claims priority to Chinese Patent Application No. 201811258080.5, field on Oct. 26, 2018, which is incorporated by reference for all purposes as if fully set forth herein.

FIELD OF THE INVENTION

The invention relates to the technical field of electrolyzed water catalytic materials, particularly to a Fe-doped MoS$_2$ nano-material, a preparation method therefor and use thereof.

DESCRIPTION OF THE RELATED ART

Excessive consumption of fossil fuels has brought many problems such as global warming and environmental pollution to human beings. Therefore, developing a clean energy alternative to fossil energy and high efficient energy converting and storage systems have become hot research focuses currently, such as the fuel cells and electrolyzed water in electrochemistry industry. Electrolytic decomposition of water involves hydrogen evolution reaction (HER) and oxygen evolution reaction (OER). Currently, the commonly used HER and OER electrocatalysts are Pt/C and Ir/C electrodes derived from precious metals, respectively. However, the high scarcity and prohibitive costs limit their large-scale applications in real life. As a functional nano-material, the metal chalcogenide has been a hot research topic in modern nano-materials. They are inexpensive and opulent, but display nearly an equivalent electrocatalytic performance to precious metals. Among them, the most widely investigated materials are MoS$_2$ nano-materials. Bulk MoS$_2$ crystals are not active HER catalysts, but two-dimensional MoS$_2$ was found to have a similar electronic structure to Pt (See B. Hinnemann, P. G. Moses, J. Bonde, K. P. Jorgensen, J. H. Nielsen, S. Horch, I. Chorkendorff, J. Norskov, J. Am. Chem. Soc. 2005, 127, 5308-5309.) and have an excellent hydrogen evolution performance. Many documents have reported methods for improving the catalytic activity of MoS$_2$, including constructing nano-sheets with plenty of active sites, manufacturing porous structures, doping other heteroatoms, and coupling conductive substrates, etc. (See X. X. Zou, Y. Zhang, Chem. Soc. Rev. 2015, 44, 5148-5180.). Although the catalytic hydrogen evolution reaction of molybdenum disulfide in acidic medium has achieved significant breakthroughs, its catalytic performance in alkaline medium has been rarely studied. Zhao Huijun's team has reported a covalent doping method to realize complete catalytic decomposition of MoS$_2$ (See Q. Z. Xiong, Y. Wang, P. F. Liu, L. R. Zheng, G. Z. Wang, H. G. Yang, P. K. Wong, H. M. Zhang, H. J. Zhao, Adv. Mater. 2018, 30, 1801450.). This method uses bacterial cellulose (BCCF) to adsorb Mo and Co from a mixed solution of $(NH_4)_6Mo_7O_{24}$ and $Co(NO_3)_2$, followed by a heating process under $N_2$ atmosphere to obtain Co—Mo$_2$C/BCCF, which is then subjected to a vapor-phase hydrothermal (VPH) reaction to give the final product Co—MoS$_2$/BCCF. Although this catalyst shows good HER and OER catalytic properties in alkali medium, its synthesis steps are lengthy and complicated.

Therefore, it is needed to design and synthesize a simple but effective, green and inexpensive catalyst with high activity and durability for the electrolysis of water, which not only has great significance for its basic researches in electrochemistry, but also can effectively promote its practical applications in energy-related fields.

SUMMARY OF THE INVENTION

The technical problem to be solved by the present invention is to provide a method for preparing a Fe-doped MoS$_2$ nano-material. The method is simple to operate, and the desired product can be obtained by a one-pot solvothermal reaction. There is no need to introduce a surfactant for morphological control during the preparation process, the resulting product has a clean surface and is easy to clean.

In order to solve the above technical problems, the present invention provides a method for preparing a Fe-doped MoS$_2$ nano-material, including the following steps:
dissolving a ferric salt and ammonium tetrathiomolybdate in DMF and reacting at 180-200° C. for 6-24 hrs to obtain the Fe-doped MoS$_2$ nano-material.

Preferably, the ferric salt is ferric chloride hexahydrate.

Preferably, the molar ratio of the ferric salt to the ammonium tetrathiomolybdate is 1-5:5. More preferably, the molar ratio of the ferric salt to the ammonium tetrathiomolybdate is 1:1.

Preferably, the reaction temperature is 200° C. and the reaction time is 12 hrs.

Preferably, the method further includes steps of washing, centrifuging and drying the reaction products.

Preferably, the solvents used in the washing step are deionized water and anhydrous ethanol.

Preferably, the rotation speed for centrifugation is 8000-12000 rpm, the centrifuging time is not less than 3 minutes; the drying temperature is 40-60° C., and the drying time is 2-12 hrs. More preferably, the rotation speed for centrifugation is 10000 rpm, the centrifugation time is 3 minutes; the drying temperature is 60° C., and the drying time is 12 hrs.

In another aspect, the present invention also provides a Fe-doped MoS$_2$ nano-material prepared by the previous method. The synthesized Fe-doped MoS$_2$ nano-material has an umbrella cap-shaped microstructure, which is named as nanocanopies of the Fe-doped molybdenum disulfide.

In still other aspect, the present invention also provides a Fe-doped MoS$_2$ nano-material supported by nickel foam, which includes a nickel foam substrate and the aforementioned Fe-doped MoS$_2$ nano-material which is loaded on the nickel foam substrate.

In a further aspect, the present invention also provides a method for preparing a Fe-doped MoS$_2$ nano-material supported by nickel foam, including the following steps:
dissolving a ferric salt and ammonium tetrathiomolybdate in DMF, immersing a nickel foam in the resulting solution and reacting at 180-200° C. for 6-24 hrs to obtain the Fe-doped MoS$_2$ nano-material supported by the nickel foam.

In a still further aspect, the present invention also provides use of the Fe-doped MoS$_2$ nano-material or the Fe-doped MoS$_2$ nano-material supported by nickel foam as an electrocatalyst for catalyzing hydrogen evolution reaction, oxygen evolution reaction and overall water splitting.

The present invention has the following technical benefits:
1. The present invention has a simple operation, and the desired product can be obtained by a one-pot solvothermal reaction.

2. The invention adopts a "bottom-up" wet chemical synthesis method, and the obtained product has a uniform morphology and high yield.
3. In the preparation process of the present invention, it is not necessary to introduce a surfactant for morphological control, thereby the surface of the product is clean and easy to clean.
4. When the Fe-doped molybdenum disulfide nanocanopies of the present invention catalyze an HER reaction in an acidic electrolyte, it shows excellent catalytic properties. At a current density of 10 mA·cm$^{-2}$, the over-potential value is only 173 mV, and the Tafel slope is also as low as 40.1 mV·dec$^{-1}$, which is significantly better than pure MoS$_2$ materials.
5. When the nano-material of the Fe-doped molybdenum disulfide supported by nickel foam of the present invention catalyzes an HER and OER reaction in an alkali electrolyte, it also shows excellent catalytic properties. At a current density of 10 mA·cm$^{-2}$, the HER over-potential value is only 153 mV, and the Tafel slope is also as low as 85.6 mV·dec$^{-1}$. At a current density of 20 mA·cm$^{-2}$, the OER over-potential value is only 230 mV, and the Tafel slope is as low as 78.7 mV·de$^{-1}$.
6. When the nano-material of the Fe-doped molybdenum disulfide supported by nickel foam of the present invention catalyzes the full hydrolysis reaction in an alkaline electrolyte, only 1.52V is required to achieve overall water splitting.

DETAILED DESCRIPTION OF THE PREFERRED EMBODIMENTS

The invention will be further illustrated in more detail with reference to the accompanying drawings and embodiments, so that those skilled in the art can better understand and implement the present invention. However, It is noted that, the following embodiments are not intended to limit the scope of the present invention.

Example 1: Preparation of Fe-Doped Molybdenum Disulfide Nanocanopies 13 mg (0.05 mmol) of ammonium tetrathiomolybdate and 13.5 mg (0.05 mmol) of ferric chloride hexahydrate solid were weighed and dissolved in 12 mL of N, N-dimethylformamide (DMF) to form a solution. The solution was then transferred to a Teflon-lined stainless autoclave. The kettle is then placed in an oven after being sealed and reacted at 200° C. for 12 hrs. After the reaction was completed, it was naturally cooled to room temperature. After being washed with deionized water and ethanol and subjected to centrifuging separation and drying process, black powdered Fe-doped molybdenum disulfide nanocanopies were obtained, named as Fe$_{0.05}$—MoS$_2$, wherein Fe represents iron ions and 0.05 represents the molar amount of the iron salt is 0.05 mmol, and MoS$_2$ represents molybdenum disulfide.

Figure 1:
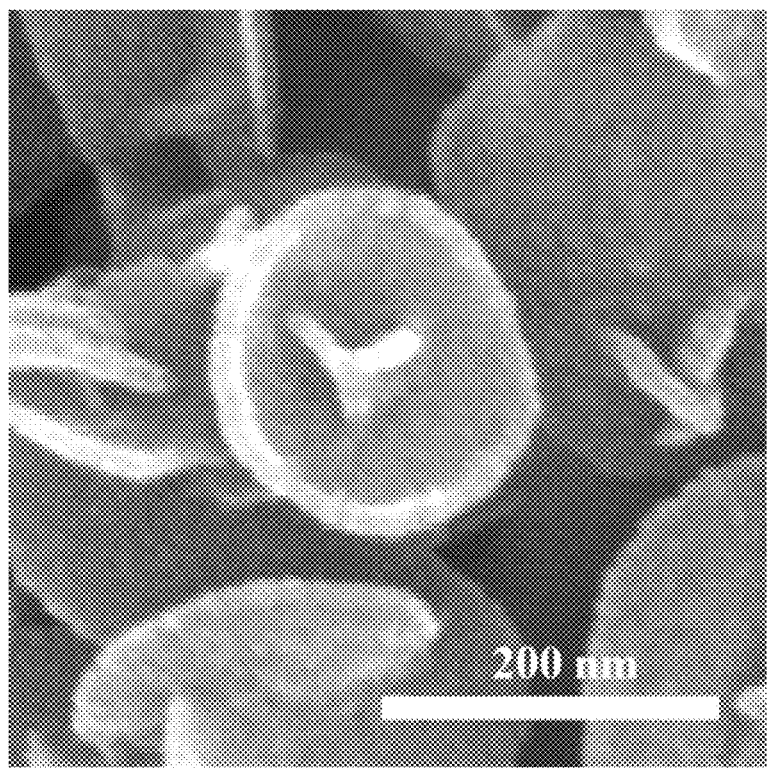
FIG. 1 is a scanning electron microscopy (SEM) image of Fe-doped molybdenum disulfide nanocanopies.
Figure 2:
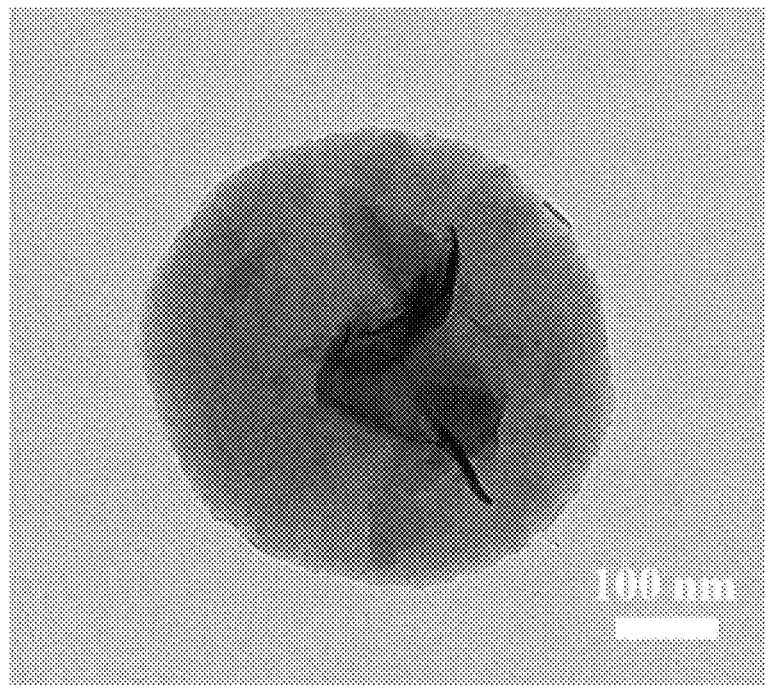
FIG. 2 is a transmission electron microscopy (TEM) image of Fe-doped molybdenum disulfide nanocanopies.

As shown in FIG. 1 and FIG. 2, the Fe-doped molybdenum disulfide nanocanopies have a uniform morphology, as well as high quality and high yield, and have a diameter of less than 200 nm and a thickness of about 30 nm.

Figure 3:
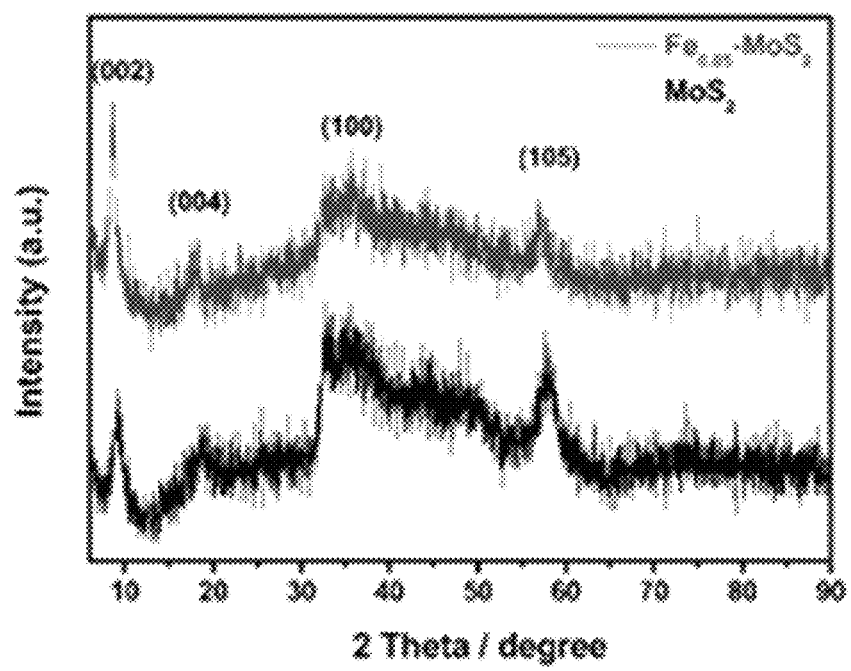
FIG. 3 is an X-ray powder diffraction (PXRD) pattern of Fe-doped molybdenum disulfide nanocanopies.

As shown in FIG. 3, the X-ray powder diffraction (PXRD) pattern of the Fe-doped molybdenum disulfide nanocanopies is conformed with the reported interlayer spacing of 9.4 Å of molybdenum disulfide in the literature (See K. Ai, C. Ruan, M. Shen, L. Lu, Adv. Funct. Mater. 2016, 265542-5549.).

Figure 4:
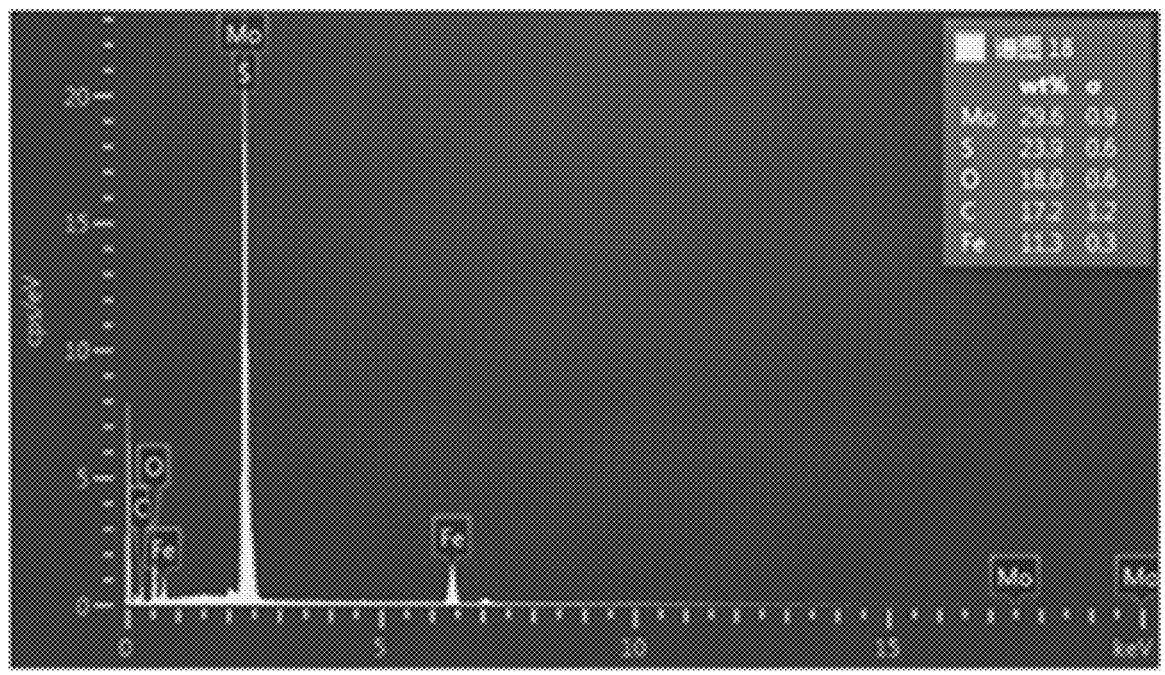
FIG. 4 is an energy dispersive X-ray spectrum (EDX) diagram of Fe-doped molybdenum disulfide nanocanopies.
Figure 5:
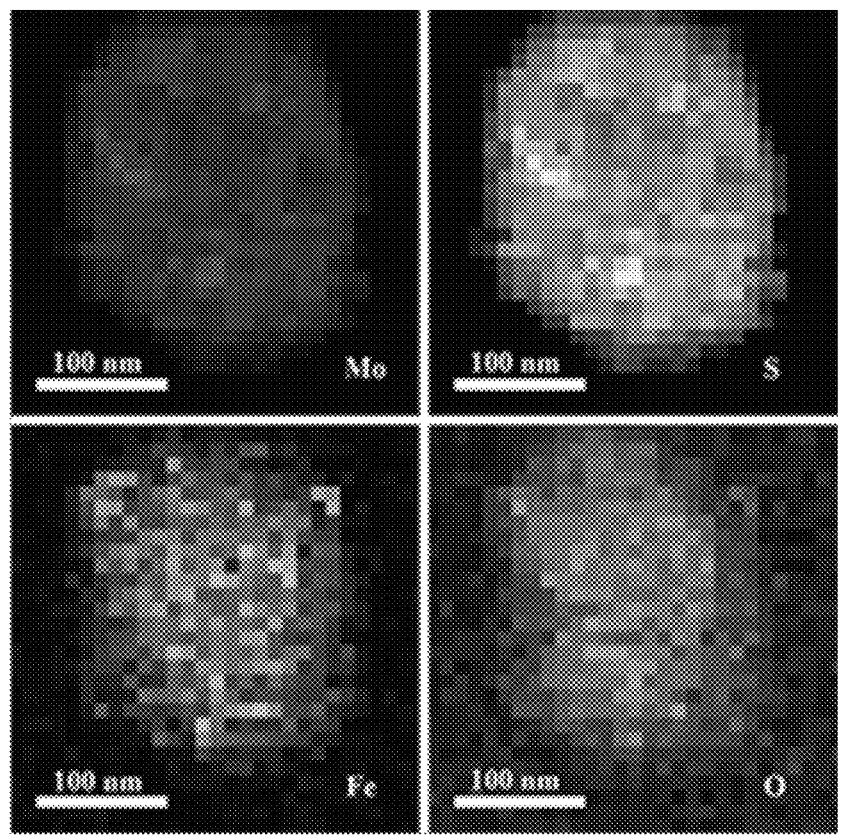
FIG. 5 is an element distribution diagram of Fe-doped molybdenum disulfide nanocanopies.

As shown in FIG. 4 and FIG. 5, the Fe-doped molybdenum disulfide nanocanopies are composed of Mo, Fe, S, and O, and each element is evenly distributed.

Figure 6:
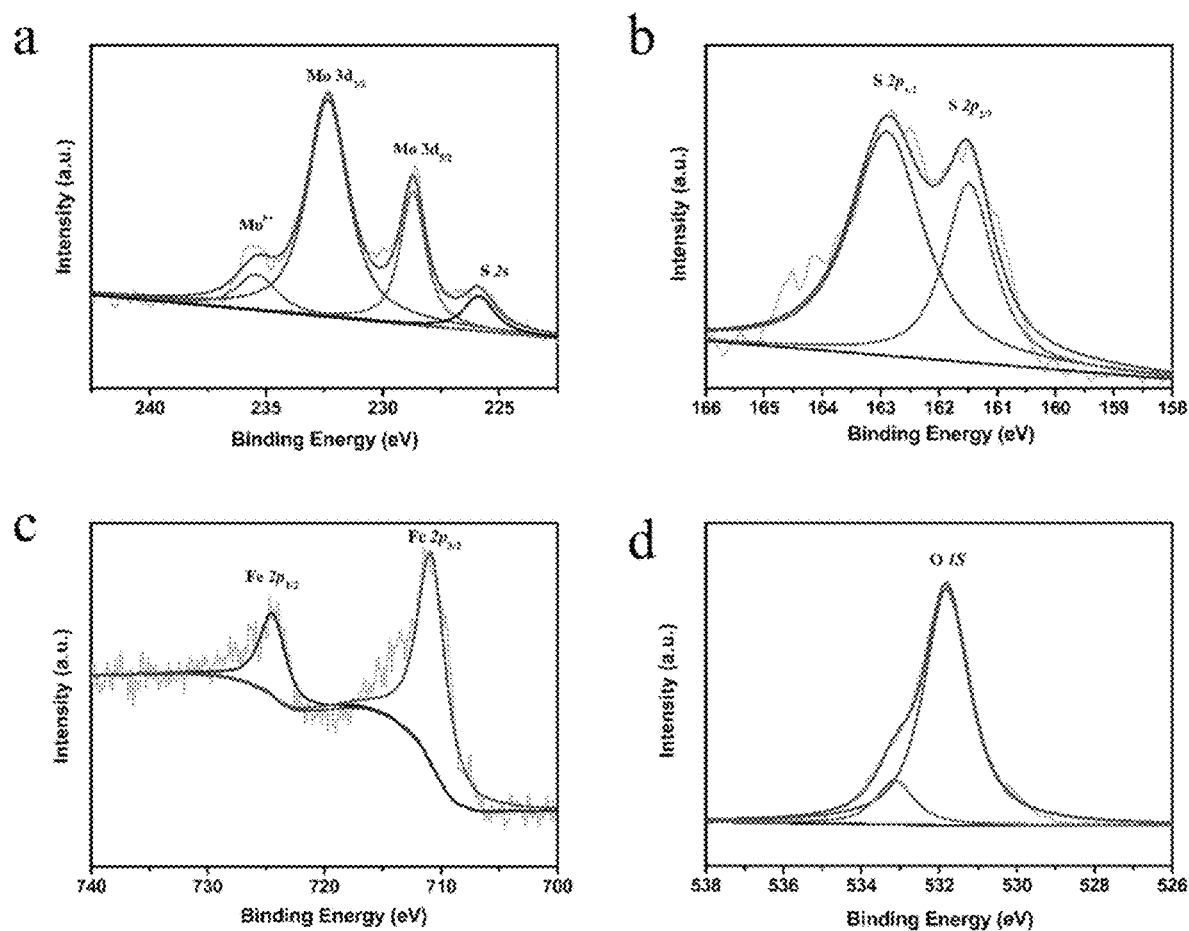
FIG. 6 is an X-ray photoelectron spectroscopy (XPS) diagram of Fe-doped molybdenum disulfide nanocanopies.

As shown in FIG. 6, the photoelectron spectroscopy (XPS) of the Fe-doped molybdenum disulfide nanocanopies shows that the valences of Mo, Fe, S, and O are +4, +2, −2, and −2, respectively.

Example 2: Preparation of a Fe-Doped Molybdenum Disulfide Nanocanopy Electrocatalyst 2.5 mg solid powder of the Fe-doped molybdenum disulfide nanocanopies and 2.5 mg of commercial available carbon black were weighed and mixed, then 970 μL of isopropanol and 30 μL of 5 wt. % Nafion solution were added, the resulting mixture was sonicated for 1 h so that it was uniformly dispersed to form an ink-like solution. 20 μL of the solution was added dropwise in batches onto the surface of the polished glassy carbon electrode, and then air-dried for later use.

As a control, 2.5 mg of the molybdenum disulfide solid powder and 2.5 mg of commercial available carbon black were weighed and mixed, then 970 μL of isopropanol and 30 μL of 5 wt. % Nafion solution were added, and the resulting mixture was sonicated for 1 h so that it was uniformly dispersed to form an ink-like solution. 20 μL of the solution was added dropwise in batches onto the surface of the polished glassy carbon electrode, and then air-dried for later use.

As a control, 5.0 mg of commercial available Pt/C (5 wt. % Pt) was weighed and added with 970 μL of isopropanol and 30 μL of 5 wt. % Nafion solution, the resulting mixture was sonicated for 1 h so that it was uniformly dispersed to form an ink-like solution. 20 μL of the solution was added dropwise in batches onto the surface of the polished glassy carbon electrode, and then air-dried for later use.

Example 3: HER Performance Test in an Acidic Electrolyte

The entire electrocatalytic test was performed under a standard three-electrode system, wherein the working electrode was the glassy carbon electrode prepared in Example 2, the reference electrode was an Ag/AgCl (saturated KCl solution) electrode, and the counter electrode was a platinum wire electrode. The electrolyte solution used for the linear scanning voltammetry (LSV) test is a 0.5M $H_2SO_4$ solution, with a potential scanning range of –0.7-0 V and a scanning speed of 5 mV/s. All the measured data was subjected to an iR-compensation.

Figure 7:
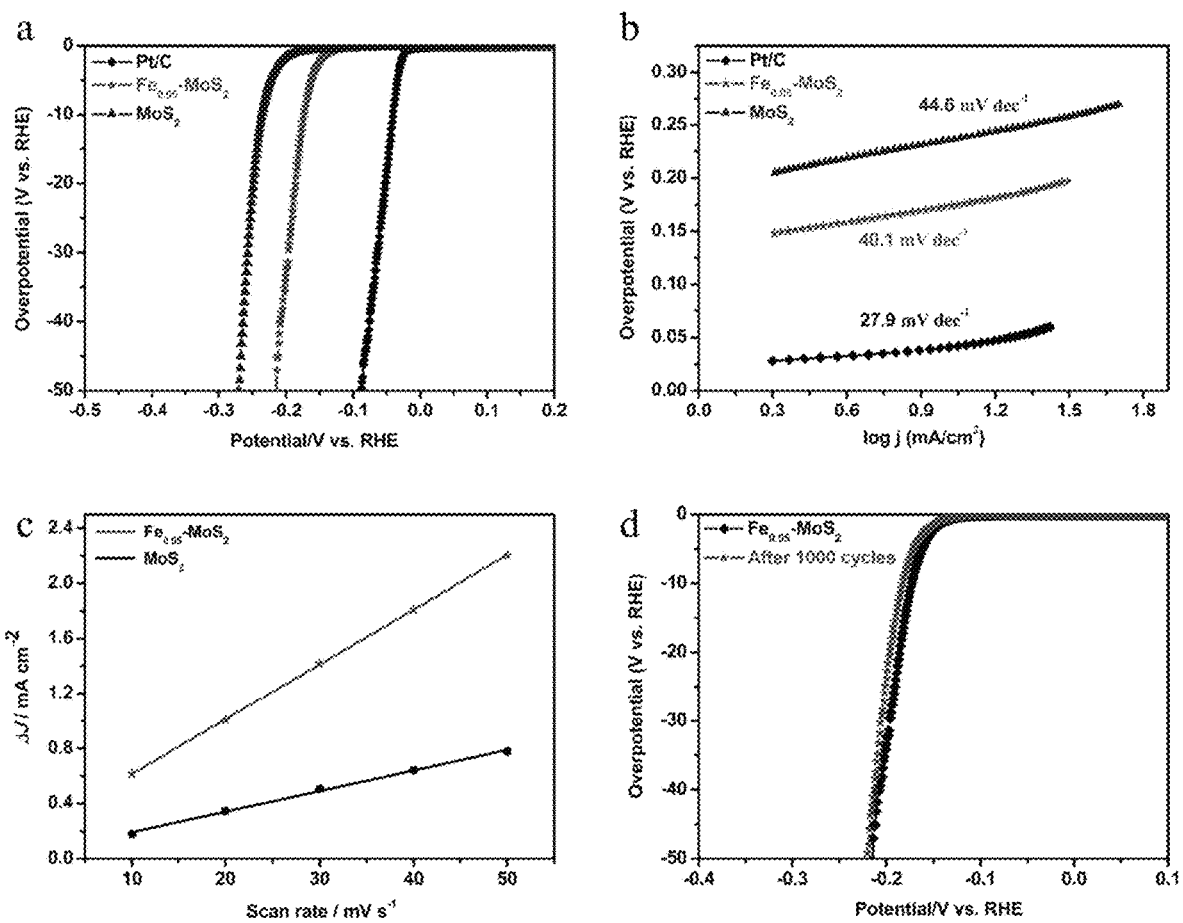
FIG. 7 shows a linear scanning voltammetry curve (a), a Tafel slope diagram (b), a double-layer capacitance diagram (c) of Fe-doped molybdenum disulfide nanocanopies in 0.5M H$_2$SO$_4$, and a control diagram of polarization curves of Fe$_{0.05}$—MoS$_2$ before and after 1000 cycles (d)

As shown in FIG. 7, compared with pure molybdenum disulfide, the Fe-doped molybdenum disulfide nanocanopies show excellent HER electrocatalytic performance. At a current density of 10 mA·$cm^{-2}$, the over-potential value is only 173 mV, and the Tafel slope is also as low as 41.1 mV·$dec^{-1}$. The double-layer capacitance value is 39.8 mF·$cm^{-2}$ and higher than molybdenum disulfide, which demonstrates that $Fe_{0.05}$—$MoS_2$ has more HER active sites than pure $MoS_2$. After 1000 cycles, the performance did not decrease significantly.

Example 4: Preparation of a Fe-Doped Molybdenum Disulfide Supported by Nickel Foam 13 mg (0.05 mmol) of ammonium tetrathiomolybdate and 13.5 mg (0.05 mmol) of ferric chloride hexahydrate solid were weighed and dissolved in 12 mL of N, N-dimethylformamide (DMF) to form a solution. The solution was then transferred to a Teflon-lined stainless autoclave and a piece of nickel foam (1 cm*2 cm) was immersed in it. The kettle was then sealed and placed in an oven and reacted at 200° C. for 12 hrs. After the reaction was completed, it was naturally cooled to room temperature. After being washed by deionized water and ethanol and dried in a blast drying oven at 60° C., a Fe-doped molybdenum disulfide supported by nickel foam was obtained, which was named as $Fe_{0.05}$—$MoS_2$/NF, wherein Fe represents ferric ions, 0.05 represents the molar amount of the ferric salt is 0.05 mmol, $MoS_2$ represents molybdenum disulfide, and NF represents nickel foam (nickle foam).

Figure 8:
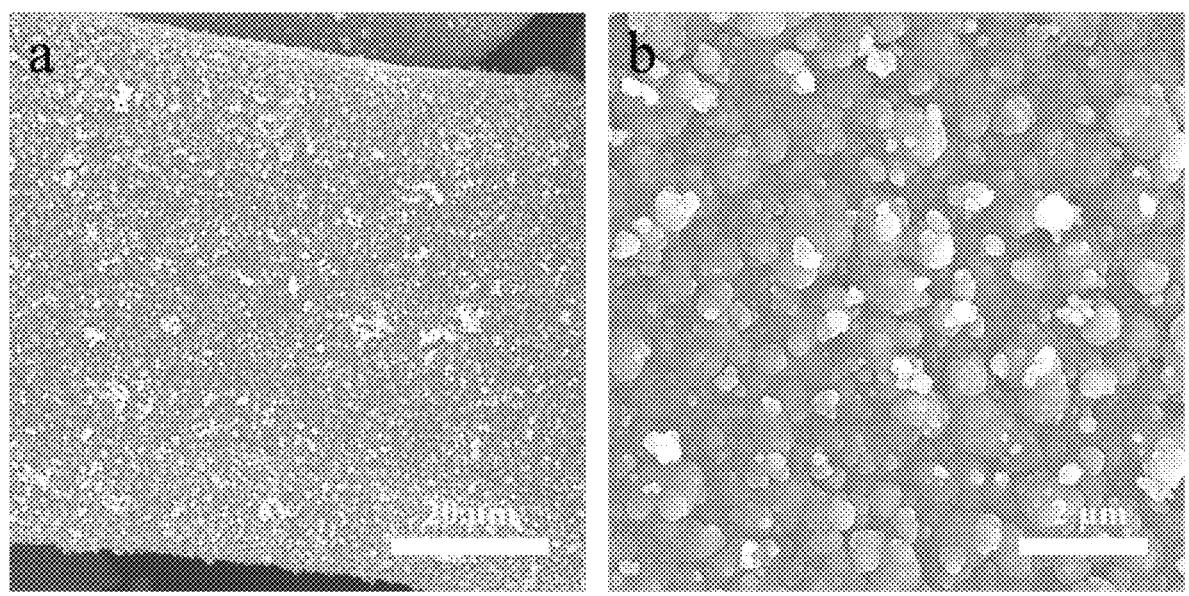
FIG. 8 is a scanning electron microscopy (SEM) image of a Fe-doped molybdenum disulfide supported by nickel foam.

As shown in FIG. 8, the Fe-doped molybdenum disulfide supported by nickel foam is dense amorphous particulates.

Figure 9:
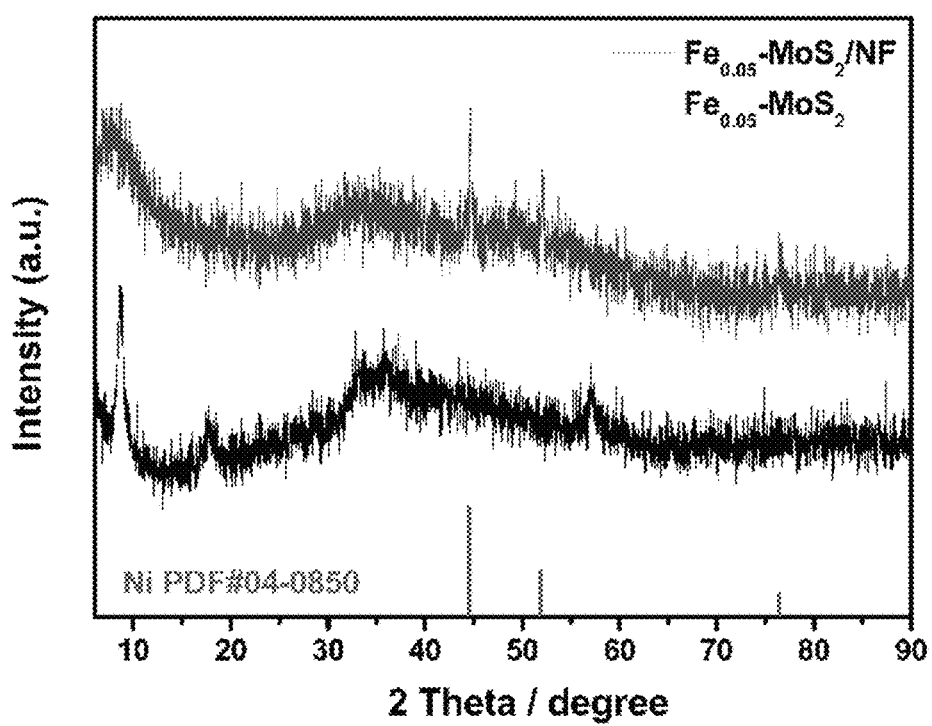
FIG. 9 is an X-ray powder diffraction (PXRD) pattern of a Fe-doped molybdenum disulfide supported by nickel foam.

As shown in FIG. 9, the powder diffraction pattern (PXRD) of the Fe-doped molybdenum disulfide supported by nickel foam is corresponding to that of the metallic nickel and molybdenum disulfide.

Example 5: HER Performance Test in an Alkaline Electrolyte

The entire electrocatalytic test was performed under a standard three-electrode system, wherein the working electrode was the Fe-doped molybdenum disulfide supported by nickel foam (with an effective area of 0.5 $cm^2$), the reference electrode was an Ag/AgCl (saturated KCl solution) electrode, and the counter electrode was a platinum wire electrode. The electrolyte solution used for the linear scanning voltammetry (LSV) test is 1M KOH solution, with a potential scanning range of –1.6 to –1 V and a scanning speed of 2 mV/s. All the measured data was subjected to an iR-compensation.

Figure 10:
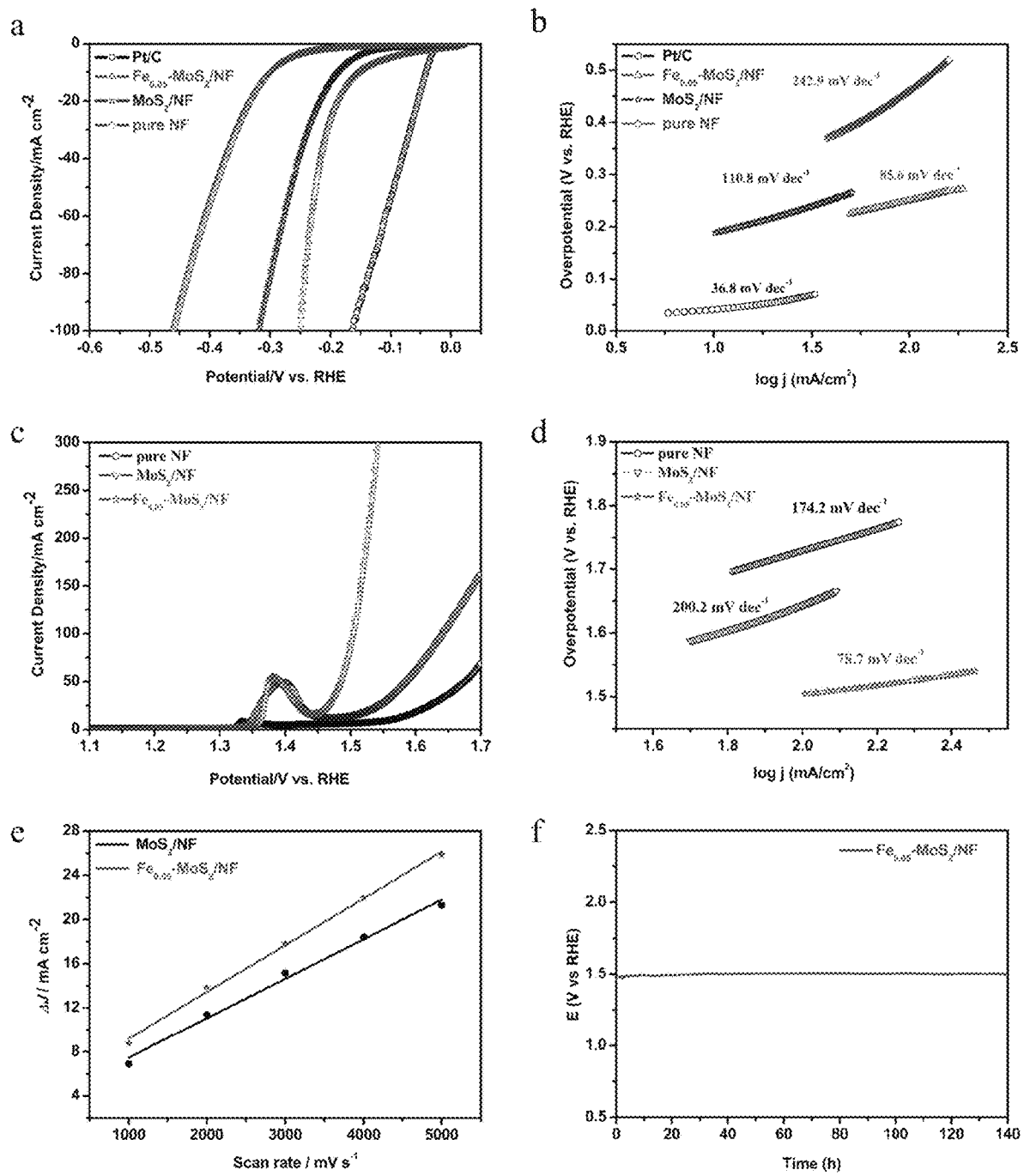
FIG. 10 shows an HER polarization curve (a), an HER corresponding Tafel slope diagram (b), an OER polarization curve (c), an OER corresponding Tafel slope diagram (d) and a double-layer capacitance diagram (e) of a Fe-doped molybdenum disulfide supported by nickel foam in 1.0M KOH electrolyte, and a chronopotentiometric measurement (f) of the OER reaction catalyzed by the Fe-doped molybdenum disulfide supported by nickel foam.

As shown in FIGS. 10 (a) and (b), compared with pure molybdenum disulfide and pure nickel foam, the Fe-doped molybdenum disulfide supported by nickel foam shows excellent HER electrocatalytic performance. At a current density of 10 mA·$cm^{-2}$, the over-potential value is only 153 mV, and the Tafel slope is also as low as 85.6 mV·$dec^{-1}$.

Example 6: The OER Performance Test in an Alkaline Electrolyte

The entire electrocatalytic test was performed under a standard three-electrode system, wherein the working electrode was the Fe-doped molybdenum disulfide supported by nickel foam (with an effective area of 0.5 $cm^2$), the reference electrode was an Ag/AgCl (saturated KCl solution) electrode, and the counter electrode was a platinum wire electrode. The electrolyte solution used for the linear scanning voltammetry (LSV) test is 1M KOH solution, with a potential scanning range of 0-0.8 V and a scanning speed of 2 mV/s. All the measured data was subjected to an iR-compensation.

As shown in FIGS. 10 (c), (d), (e), and (f), the Fe-doped molybdenum disulfide supported by nickel foam exhibits excellent OER electrocatalytic performance. At a current density of 20 mA·$cm^{-2}$, the over-potential value is only 230 mV, and the Tafel slope is also as low as 78.7 mV·$dec^{-1}$. The Fe-doped molybdenum disulfide supported by nickel foam also shows an excellent stability. And the electrocatalytic performance did not decrease significantly after 140 hrs of the constant current chronopotential test.

Example 7: Overall Water Splitting Test in an Alkaline Electrolyte

The entire electrocatalytic test was performed under a double-electrode system, wherein both electrodes were the Fe-doped molybdenum disulfide supported by nickel foam (with an effective area of 0.5 $cm^2$). The electrolyte solution used for the linear scanning voltammetry (LSV) test is 1M KOH solution, with a potential scanning range of 0.8-2 V and a scanning speed of 5 mV/s.

Figure 11:
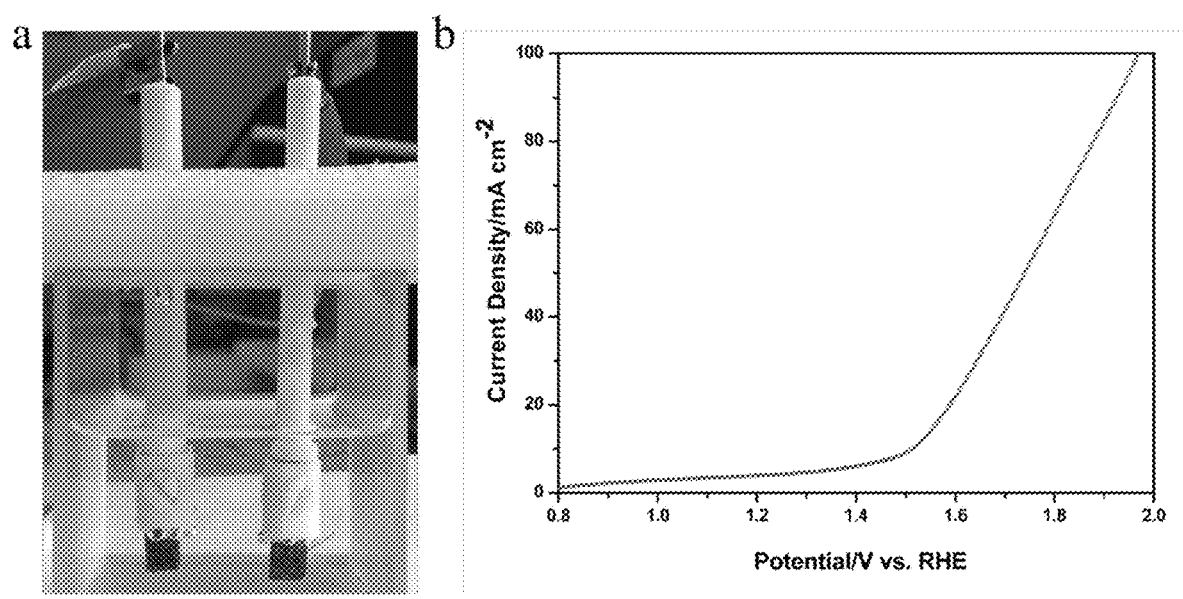
FIG. 11 shows an apparatus (a) for overall water splitting by using the Fe-doped molybdenum disulfide supported by nickel foam in 1.0M KOH electrolyte, and a polarization curve (b) of the overall water splitting.

As shown in FIG. 11, the Fe-doped molybdenum disulfide supported by nickel foam shows excellent total hydrolysis catalytic performance, and it can reach a current density of 10 mA·$cm^{-2}$ at only 1.52 V.

The above descriptions are only preferred embodiments of the present invention and not intended to limit the present invention, it should be noted that those of ordinary skill in the art can further make various modifications and variations without departing from the technical principles of the present invention, and these modifications and variations also should be considered to be within the scope of protection of the present invention. The protection scope of the present invention is defined by the claims.

What is claimed is:

1. A method for preparing a Fe-doped $MoS_2$ nano-material, comprising steps of:

dissolving a ferric salt and ammonium tetrathiomolybdate in DMF and reacting at 180-200° C. for 6-24 hrs to obtain the Fe-doped $MoS_2$ nano-material.

2. The method according to claim 1, wherein the ferric salt is ferric chloride hexahydrate.

3. The method according to claim 1, wherein the molar ratio of the ferric salt to ammonium tetrathiomolybdate is 1-5:5.

4. The method according to claim 1, wherein the method further comprises the steps of washing, centrifuging and drying the reaction product.

5. The method according to claim 4, wherein the solvents used in the washing step are deionized water and anhydrous ethanol.

6. The method according to claim 4, wherein the rotation speed for centrifugation is 8000-12000 rpm, the centrifugation time is not less than 3 minutes; the drying temperature is 40-60° C., and the drying time is 2-12 hrs.

7. A Fe-doped $MoS_2$ nano-material prepared by the preparation method according to claim 1.

8. A Fe-doped $MoS_2$ nano-material supported by nickel foam, comprising a nickel foam substrate and the Fe-doped $MoS_2$ nano-material according to claim 7 which is loaded on the nickel foam substrate.

9. A method for preparing a Fe-doped $MoS_2$ nano-material supported by nickel foam according to claim 8, comprising steps of:

dissolving a ferric salt and ammonium tetrathiomolybdate in DMF, immersing a nickel foam in the resulting solution and reacting at 180-200° C. for 6-24 hrs to obtain the Fe-doped $MoS_2$ nano-material supported by the nickel foam.

10. An electrocatalyst for catalyzing an hydrogen evolution reaction, an oxygen evolution reaction and a full hydrolysis reaction, comprising the Fe-doped $MoS_2$ nano-material supported by nickel foam according to claim 8.

* * * * *